United States Patent
Alps et al.

(10) Patent No.: US 8,133,928 B2
(45) Date of Patent: Mar. 13, 2012

(54) METHOD FOR DECANTING PRECONDITIONED ION-EXCHANGE RESIN SUSPENSIONS

(75) Inventors: Ernst-Joachim Alps, Dormagen (DE); Ulrich Blaschke, Krefeld (DE); Christian Münnich, Leverkusen (DE); Stefan Westernacher, Kempen (DE)

(73) Assignee: Bayer MaterialScience AG, Leverkusen (DE)

( * ) Notice: Subject to any disclaimer, the term of this patent is extended or adjusted under 35 U.S.C. 154(b) by 420 days.

(21) Appl. No.: 12/129,851

(22) Filed: May 30, 2008

(65) Prior Publication Data
US 2008/0306174 A1   Dec. 11, 2008

(30) Foreign Application Priority Data
Jun. 8, 2007   (DE) .......................... 10 2007 026 549

(51) Int. Cl.
*B01J 47/10* (2006.01)
*B01J 41/12* (2006.01)

(52) U.S. Cl. ........................................... 521/28; 521/30
(58) Field of Classification Search .................. 521/28, 521/30
See application file for complete search history.

(56) References Cited

U.S. PATENT DOCUMENTS

| | | | |
|---|---|---|---|
| 3,037,052 A | 5/1962 | Bortnick | |
| 3,284,419 A | 11/1966 | Helfferich | |
| 4,191,843 A | 3/1980 | Kwantes et al. | |
| 6,723,881 B1 * | 4/2004 | Bodiger et al. | 568/335 |
| 2003/0211934 A1 | 11/2003 | Hayashi et al. | |

FOREIGN PATENT DOCUMENTS

| | | |
|---|---|---|
| EP | 1239958 B1 | 9/2002 |
| GB | 967476 | 8/1964 |
| GB | 2336159 | 10/1999 |
| JP | 6296871 | 10/1994 |
| JP | 6304479 | 11/1994 |
| WO | WO-01/37992 A1 | 5/2001 |
| WO | WO-0137992 | 5/2001 |

* cited by examiner

*Primary Examiner* — Michael M Bernshteyn
(74) *Attorney, Agent, or Firm* — Connolly Bove Lodge & Hutz LLP

(57) ABSTRACT

A process for the storage or transportation of pretreated, conditioned ion exchangers as catalysts for chemical reactions is disclosed. The preconditioned ion-exchange resin is kept as preconditioned ion-exchange resin suspension in a storage or transporting container. The container with the preconditioned ion-exchange resin suspension is transported to either a storage site for storage or to a reactor for transfer of the resin to the reactor.

9 Claims, 1 Drawing Sheet

METHOD FOR DECANTING PRECONDITIONED ION-EXCHANGE RESIN SUSPENSIONS

PRIORITY

Priority is claimed to German Patent Application No. 10 2007 026549, filed Jun. 8, 2007. German Patent Application No. 10 2007 026549 and the references cited therein are incorporated by reference in their entirety for all useful purposes.

FIELD OF THE INVENTION

The field of the present invention relates to a method for the storage of pretreated, conditioned ion-exchange resin suspensions as catalysts for chemical reactions, and also relates to the storage, transportation and the decanting of these preconditioned ion-exchange resin suspensions into a reactor.

BACKGROUND

It is known to use in particular acid cation exchangers for the catalysis of chemical reactions, such as for example for the condensation of ketones or aldehydes with phenols to form bisphenols. Condensation reactions are known in the literature, such as for example the synthesis of bisphenols, which is generally carried out by acid-catalyzed reaction of phenols with carbonyl compounds. This last reaction is generally carried out under heterogeneous catalysis in fixed bed or fluidized bed reactors, as well as in reactive columns. Catalysts of cross-linked sulfonated polystyrene resins (acid ion-exchangers; cation exchangers) are normally used for example in the synthesis of bisphenols. These ion exchangers can optionally be chemically modified by covalently or ionically bound co-catalysts and are macroporous or in gel form, as is described in U.S. Pat. No. 4,191,843 and U.S. Pat. No. 3,037,052.

It is also known to subject in particular acid cation exchangers to a pre-treatment before they are used as catalysts in chemical reactions, in which for example elutable acid-containing constituents are removed from the catalyst bed, so that in the subsequent reaction they do not lead to the formation of undesired by-products. Such a pre-treatment, which is generally also connected with a dewatering of the washed ion exchanger and is normally termed conditioning, is indispensable in particular for the production of bisphenols using acid ion exchangers, and is described in WO-A 01/37992.

It is furthermore known that cation exchangers that are pretreated and are used for the synthesis of bisphenols can be unstable, as can be seen from the teaching of JP-A 000006296871 and JP-A 000006304479. JP-A 000006296871 now describes methods by which the handling, storage and transportation of the unstable catalyst can be avoided. The methods outlined here describe how the conditioning takes place in the reactor subsequently used for the catalysis. JP-A 000006296871 thus describes a method in which the conditioning takes place beforehand in the reactor used for the catalysis, so that a storage and a transportation of the unstable ion exchanger is not necessary, but the reactor for the actual catalysis cannot simultaneously be used at the time of the conditioning. A treatment of the ion exchanger that is carried out under stationary conditions, for example in a reaction apparatus, is likewise described in EP-A 1239958. The implementation of a pre-treatment/conditioning of ion exchangers in the reaction apparatus has the disadvantage that the reaction apparatus during the conditioning is not available for the production process and the catalyst conditioning thus means a production breakdown.

In order to avoid such a production breakdown, it is possible to carry out the necessary conditioning of the ion exchanger in a separate conditioning apparatus decoupled from the actual production process. This however means additional investment costs, which have an adverse influence on the economy of the overall production process. This effect is all the more pronounced the more the conditioning apparatus is only partially utilized, as is often the case in catalyst replacements that are carried out batch-wise.

The preconditioning of a cation-exchange resin suspension for the catalyzed reaction of acetone with phenol to form bisphenol A is described in WO-A 01/37992. WO-A 01/37992 also describes how this preconditioning can be carried out in an external vessel upstream of the reactor, but does not describe how such a preconditioned ion-exchange resin suspension can be stored for a prolonged period or transported to other production sites and transferred there to the respective reactor, without the preconditioned ion-exchange resin suspension losing its properties that are important for the catalysis.

Such a procedure means a restriction as regards the efficient provision, arrangement and utilization of apparatuses and parts of equipment for the catalyst pre-treatment and conditioning, in particular for users operating a plurality of production plants in which a repeated catalyst exchange is necessary.

The object of the invention is accordingly to provide a process that enables the preconditioned ion-exchange resin suspension to be stored and also transported over prolonged periods and then decanted into a reactor, without the ion-exchanger losing over this time the necessary properties as a reaction catalyst. By means of such a process the preconditioned ion-exchange resin suspension is independent of the production site, for example of the bisphenol synthesis, contrary to the teaching of JP-A 000006296871 and JP-A 000006304479.

Contrary to the preconception disclosed in the teaching of JP 000006296871 and JP 000006304479, it is now found that pretreated, conditioned cation exchange resin suspensions for the bisphenol synthesis can perfectly well be stored, transported and then decanted into a reactor, without thereby losing their activity and their usability for this synthesis, if in this connection the process described hereinafter is employed for the storage of preconditioned ion-exchange resin suspensions.

SUMMARY OF THE INVENTION

The present invention is directed toward a process for the storage of pretreated, conditioned ion exchangers as catalysts for chemical reactions. The preconditioned ion-exchange resin is kept as preconditioned ion-exchange resin suspension in a laboratory or transporting container and is either transported to a storage site and stored there temporarily, or is transported to a reactor to be filled and is transferred to the latter.

The process may be advantageous if the storage or transporting container can be heated.

The process may be advantageous if the ion-exchange resin suspension is kept in the storage or transporting container in the presence of less than 500 vol. ppm of oxygen in the gaseous phase with a solids content of 20 to 80 vol. % referred to the ion-exchange resin suspension.

The process may be advantageous if the preconditioned ion-exchange resin suspension present in the heatable storage or transporting container in liquid or solidified or partly solidified form is converted into a pumpable ion-exchange resin suspension by careful melting if the suspension is solidified or partially solidified, with less than 500 vol. ppm of oxygen in the gaseous phase, using suitable pumps that do not damage the ion exchanger, removed from the storage or transporting container and transferred via suitable pipelines or suitable flexible connections to a reactor at temperatures from 50° to 80° C. and with a solids content of 20 to 80 vol. % referred to the ion-exchange resin suspension, with less than 500 vol. ppm of oxygen in the gaseous phase.

The process may be advantageous if the liquid phase of the preconditioned ion-exchange resin suspension is an OH component.

The process may be advantageous if the OH component is phenol.

The process may be advantageous if the OH component is phenol that still contains a residual water content in the range from 0.1-10%, preferably 0.2-5%, particularly preferably 0.5-3%, referred to phenol.

The process may be advantageous if the ion exchangers of the preconditioned ion-exchange resin suspensions have a gel-type or macroporous structure.

The process may be advantageous if the liquid phase contained in the preconditioned ion-exchange resin suspension is, in the transfer from the storage or transporting container to the reactor, partly recycled in the circulation of the storage or transporting container (1) via the line (3), and partly recycled through the line (4) to the storage or transporting container (1).

The process may be advantageous if the preconditioned ion exchanger is stored in phenol and the amount of phenol referred to the total amount of the ion exchanger/phenol suspension is 20 to 80 wt. %. The amount of liquid and solid phase in the ion exchanger/phenol suspension can vary during the conveying processes.

The process may be advantageous if the ion-exchange resin in the preconditioned ion-exchange resin suspension is a cationic ion-exchange resin.

The preconditioned ion-exchange resin suspension as end product of the catalyst pre-treatment and conditioning is transferred from the unit for the catalyst pretreatment with an oxygen content in the gaseous phase of less than 500 vol. ppm as ion-exchange resin suspension in a pumpable form to a storage or transporting container. Suitable storage or transporting containers are those that allow the ion-exchange resin suspension to be in a pumpable form when it is removed, and are preferably heatable storage containers or transporting containers that consist of a suitable stainless steel or other materials that are corrosion resistant under storage conditions of the suspension or that are treated so as to be corrosion resistant. Suitable materials for the storage or transporting containers are for example stainless steels of the types 1.4571, 1.4404 or other, enameled containers, ceramic or vitreous containers or plastics containers that are resistant to organic or inorganic acids or bases, water or atmospheric oxygen. Suitable storage or transporting containers are for example heatable railway wagons, overseas containers or road tankers. Stainless steel that is corrosion resistant under the storage and transporting conditions of the suspension is preferably used as container material.

Suitable containers preferably have ventilation and pressure release devices covered with a blanket of inert gas.

The preferred storage temperature is <60° C., particularly preferably <40° C.

The storage time is preferably less than 12 months, more preferably less than 6 months and most particularly preferably less than 3 months. If storage is for more than 12 months, then depending on the ion exchanger an additional operating step may be necessary in order to remove from the ion exchanger elutable amounts of acid that have possibly formed during the storage time.

Ion-exchange resin suspensions in pumpable form are understood to mean those ion-exchange resin suspensions that for the transfer with the aid of a pump have a temperature in the storage or transporting container that is in the range from 50° to 90° C., preferably 60° to 80° C., and that preferably have a solids content of 20 to 80 wt. %, more preferably 30 to 70 wt. %.

The preconditioned ion-exchange resin suspension can be present in liquid, solidified or partially solidified form in the storage or transporting container during the storage or transportation with less than 500 vol. ppm of oxygen.

The preconditioned ion-exchange resin suspension is transferred to a reactor after the storage time has elapsed or after completion of the transportation, wherein the preconditioned ion-exchange resin suspension, should it not be in pumpable form but instead in solidified or partially solidified form, is carefully melted and the preconditioned ion-exchange resin suspension thus present in pumpable form is then transferred with suitable pumps from the storage or transporting container to the reactor with less than 500 vol. ppm of oxygen in the gaseous phase. The pumps used for the transfer are those that do not damage the ion-exchange resin suspension, and are preferably those in which the conveyance takes place under low shear forces, low abrasion and thus in a gentle manner for the ion-exchange resin of the ion-exchange resin suspension, membrane pumps being particularly preferred. The energy input in the conveyance of the ion-exchange resin suspensions should preferably not exceed 150 $W/m^3$, and is preferably in the range from 20 to 130 $W/m^3$. For the transfer from the storage or transporting container to the reactor, pipes or suitable flexible connections are employed, which are corrosion resistant and can withstand unchanged the prevailing temperatures, which are in the range from 50° to 90° C. These pipes or flexible connections are preferably made of suitable materials, for example stainless steels of the types 1.4571, 1.4404 or other steels or steel flex hoses or reinforced hoses.

It has been found that ion-exchange resin suspensions preconditioned by the disclosed process can be stored and transported in suitable liquids without being damaged by the mechanical stresses caused by the transportation, due to pumping and solidification as well as melting of the suspension. Using conventional analytical techniques such as for example optical methods for determining particle fracture, microscopy and particle size measurements, it has been shown that the disclosed process, which also includes the solidification, partial solidification and melting of the ion-exchange resin suspension, does not cause any measurable mechanical damage to the preconditioned ion exchanger. Preconditioned ion-exchange resin suspensions can, being liquid phases, employ all those solvents that during the actual catalysis are not deleterious for the reaction and do not lead to superfluous by-products. Particularly preferred are all solvents that can be used in conventional polycondensation reactions. Preconditioned ion-exchange resin suspensions that are to be used subsequently as catalyst for the production of bisphenol can contain as liquid phases in the ion-exchange resin suspensions OH-containing liquid phases such as water and also organic solvents such as phenol or mixtures of these liquid phases. Phenol is preferred as liquid phase for the preconditioned ion-exchange resin suspensions that are to be used for the production of bisphenol A. A preferred embodiment of the process is the storage or transportation of preconditioned ion-exchange resin suspensions that are to be used for the production of bisphenol A from acetone and phenol. These preconditioned ion-exchange resin suspensions preferably contain an OH-containing liquid phase, particularly preferably phenol, as liquid phase in the ion-exchange resin suspension.

The ion exchanger conditioned in this way is outstandingly suitable for the production of bisphenols, in particular for the production of bisphenol A (BPA) from acetone and phenol. The SPA produced with this ion exchanger has high product qualities and is particularly suitable for the production of polymers such as epoxy resins, and especially polycarbonates. The polycarbonates thereby produced are used for the production of moulded articles, such as in particular compact discs, lenses and disks.

BRIEF DESCRIPTION OF THE DRAWINGS

The process is described in more detail hereinafter with the aid of the accompanying drawing.

DETAILED DESCRIPTION OF THE PREFERRED EMBODIMENT

Figure 1:
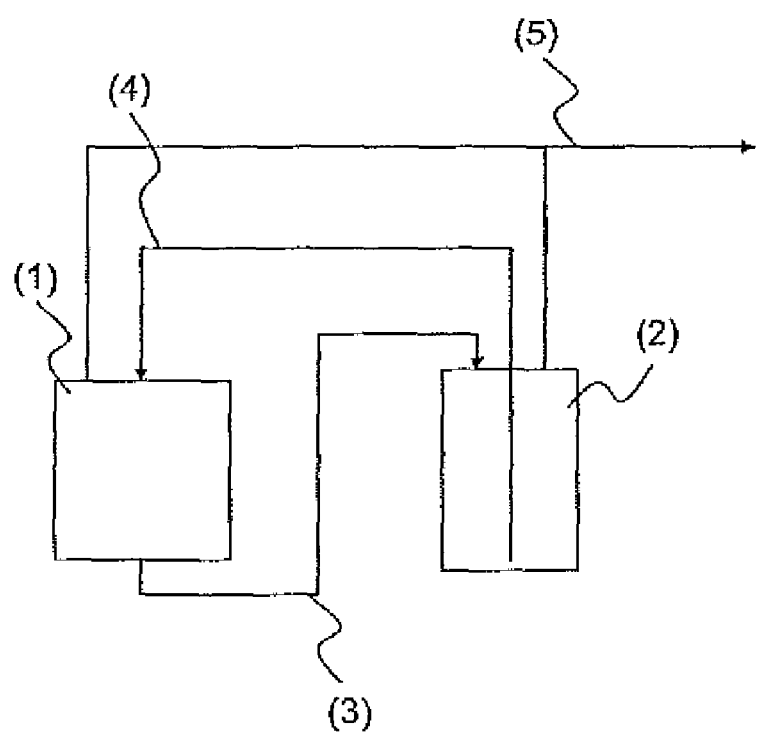
FIG. 1 illustrates the decanting of the preconditioned ion-exchange resin suspension.

In FIG. 1 the reference numeral (1) denotes a storage or transporting container that can be heated, reference numeral (2) denotes a container that can be stirred and heated, reference numeral (3) denotes a line through which the ion-exchange resin suspension is conveyed to the container (2), reference numeral (4) denotes a line which diverts the liquid phase of the ion-exchange resin suspension, and reference numeral (5) denotes a connection to a waste air venting device. For the decanting of the ion-exchange resin suspension from the storage or transporting container into the container (2), the ion-exchange resin suspension is conveyed by means of suitable conveying devices through the line (3) from the storage or transporting container (1) to the container (2). Suitable conveying devices are for example membrane pumps. In this way the gas volume of the container (2), which is preferably rendered inert, is displaced through the line (5). Excess liquid phase of the ion-exchange resin suspension is recycled to the storage or transporting container (1) by means of suitable conveying devices via the line (4), which is provided with a filtration device in order to retain ion exchanger contained in the suspension. It is furthermore possible if necessary to convey additional phenol (fresh phenol) to the storage or transporting container (1), to the container (2) or the lines (3) or (4) into the system, or remove excess phenol from the system. The end of the resulting circulation-type conveyance is determined for example optically or with the aid of suitable measurement devices. Suitable measurement devices include measurement methods known to the person skilled in the art for measuring levels or conveyance of substance flows. All lines are preferably provided with heating means and equipped with safety devices against excess pressure.

A further advantage of the described process is the fact that, due to the process for the decanting and subsequent damage-free transportation of the preconditioned ion-exchange resin suspension, the utilization of a corresponding preconditioning unit independent of the actual catalysis reactor can be significantly increased by the dispatch and conveyance of the preconditioned ion-exchange resin suspension. In this way on the one hand economic advantages are achieved in the operation of the preconditioning unit and on the other hand resources are conserved, since not each individual production plant has to be equipped with a preconditioning unit in order to utilize the advantage of the short downtime of a catalyst reactor during the preconditioning.

It has also been found that, for example for the bisphenol A production, the phenol from the preconditioned ion-exchange resin suspension may after transportation, solidification and remelting, according to the disclosed process, be contaminated with acidic soluble fractions from the ion exchanger. The amount of acid-containing elutable fractions in the thereby occurring phenol increases with the time that elapses between the conditioning and use in a reaction vessel. For any desired re-use, in particular as starting material for the production of BPA, the thereby occurring phenol is therefore preferably purified by distillation, in which connection the bottom of the column can be charged with up to 5 wt. % of a basic compound which is capable of retaining acidic constituents. A preferred basic compound is sodium hydroxide.

In order to remove effectively from the ion exchanger minor amounts of acidic soluble fractions that may possibly have formed in the ion exchanger in the time that has elapsed between the conditioning and use in a reaction vessel, it is possible to wash the conditioned ion exchanger with phenol at 50° to 90° C., preferably at 60° to 80° C. This wash is carried out in the catalysis reactor. 1 to 2 bed volumes of the conditioned ion exchanger have proved suitable as effective amounts of phenol for removing minor amounts of acidic and soluble fractions.

The disclosed process for the conveyance, storage and transportation of ion-exchange resin suspensions is also suitable for the conveyance, storage and transportation of other dimensionally stable heterogeneous catalysts that can be used for example for condensation reactions.

The disclosed process avoids not only the disadvantages of the known stationary catalyst conditionings described above, but also permits at the same time the optimal use of the preconditioned ion-exchange resin suspensions as catalyst resins in condensation reactions, preferably in condensation reactions starting from phenols, o-, m-, p-cresols or α- or β-naphthols, particularly preferably in the synthesis of bisphenols, and most particularly preferably in the synthesis of BPA from phenol and acetone. The preconditioned ion-exchange resin suspensions are however also outstandingly suitable for use as catalysts in addition reactions. Examples of addition reactions that may be mentioned are the addition of alcohols to alkenes, preferably of alcohols to $C_1$-$C_4$-alkenes, particularly preferably the addition of methanol, ethanol, propanol or butanol to isobutene, and most particularly preferably of methanol to isobutene to form methyl tert.-butyl ether.

The preconditioned ion-exchange resin suspensions are in addition suitable for the catalysis of esterifications by reaction of alcohols with carboxylic acids, preferably $C_1$-$C_8$-alcohols with $C_1$-$C_8$-carboxylic acids, particularly preferably for the esterification of methanol, ethanol, propanol and all isomers of butanol with carboxylic acids of the series formic acid, acetic acid, propionic acid or butyric acid.

In addition the preconditioned ion-exchange resin suspensions are suitable for the catalysis of transesterification reactions, for example of tri-esters to mono-esters, in particular the transesterification of a triglyceride with methanol, ethanol, propanol or butanol to a fatty acid mono-ester.

Finally, the conditioned ion-exchange resin suspensions are suitable for the catalysis of alkylation reactions, for example the alkylation of phenols or cresols with linear or branched olefins, for example to triisobutene or nonene.

The following example serves to illustrate the process described above, though the invention is not restricted to this example.

EXAMPLE 1

Commercially obtainable sulfonic acid ion exchanger based on cross-linked polystyrene (Lewatit® K 1221, Lanxess company) is first of all washed with fully deionized water in order to remove free acid fractions from the catalyst, and is then dewatered by washing with phenol:

The water wash (oxygen content in the fully deionized water<20 ppb) is carried out in an intermittently stirred conditioning vessel under a nitrogen atmosphere in 12 cycles at 30° C., the residual conductivity of the wash water at the outlet being 14 microSiemens/cm in the last cycle. The dewatering is carried out continuously under a nitrogen atmosphere at 70° C. with phenol. At the same time the volume of the ion exchanger decreases by ca. 48%. The aqueous phenol occurring at the outlet is distilled off by distillation at initially 700 mbar and 105° C. bottom temperature. At the end of the distillation the vacuum is reduced to 130 mbar; the bottom temperature rises to 125° C. In this way 1 to 10% of the total amount of liquid present in the stirred vessel leaves the distillation column in an increasing amount per hour. Phenol is recycled as bottom product to the dewatering vessel. The head product from the column (8% phenol, 92% water) is passed to a continuous extraction unit. In this way removed phenol is constantly replenished by fresh phenol The continuous dewatering is terminated when a water content of 2.5 wt. % residual water in phenol is achieved at the outlet. The ion exchanger is transferred at 70° C. as a suspension in phenol (solids fraction 40 vol. %) by conveyance with membrane pumps through pipelines and flexible connections to suitable partly heatable transporting containers. Supernatant phenol is drained off and purified by distillation at 120° C. and 150 mbar over sodium hydroxide (0.001 wt. %). The ion-exchange resin suspension preconditioned in this way is transported by means of conventional transportation means by rail and water to the desired production site. The overall transport time is ca. 6 weeks. The solidified ion-exchange resin suspension is melted for its transfer to the production vessel (reactor). For this purpose the partly heatable transporting container is heated with water at 75° C. and low pressure steam at a temperature of 110° C. In this connection care is taken to ensure that the temperature in the partly heatable railway wagon does not exceed 75° C. at any point. After the suspension has been melted it is pumped by means of membrane pumps and addition of phenol, heated to a temperature of 70° C., from the transporting container to the reactor, and used for the continuous production of 2,2-bis(4-hydroxyphenyl) propane. The phenol used for the pumping operations is purified by distillation at 120° C. and 150 mbar over sodium hydroxide (0.001 wt. %) and re-used in the process.

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

What is claimed:

1. A process for the transportation of pretreated, conditioned cation ion exchangers as catalysts for chemical reactions, the process comprising:
   keeping the preconditioned ion-exchange resin as preconditioned ion-exchange resin suspension in phenol in a transporting container; and
   transporting the container to a reactor for transfer of the resin to the reactor,
   wherein energy input during transfer of the ion-exchange resin suspension to the reactor does not exceed 150 W/m$^3$.

2. The process according to claim 1, further comprising heating the transporting container.

3. The process according to claim 1, wherein the ion-exchange resin suspension is kept in the transporting container in the presence of less than 500 vol. ppm of oxygen in the gaseous phase with a solids content of 20 to 80 vol. % referred to the ion-exchange resin suspension.

4. The process according to claim 3, further comprising
   converting any solidified or partially solidified preconditioned ion-exchange resin suspension into a pumpable ion-exchange resin suspension having less than 500 vol. ppm oxygen;
   removing the preconditioned ion-exchange resin suspension from the transporting container with pumps that do not damage the ion exchanger; and
   transferring the preconditioned ion-exchange resin suspension through one of pipelines or flexible connections to a reactor at temperatures from 50° C. to 80° C. and with a solids content of 20 to 80 vol. % with less than 500 vol. ppm of oxygen.

5. The process according to claim 4, wherein the liquid phase contained in the preconditioned ion-exchange resin suspension is, in the transfer from the transporting container to the reactor, partly recycled in the circulation of the transporting container via the line, and partly recycled through the line to the transporting container.

6. The process according to claim 3, wherein the preconditioned ion-exchange resin suspensions include ion exchangers having a gel-form or macroporous structure.

7. A process for conveying pretreated, conditioned ion-exchange resin as catalysts for chemical reactions, the process comprising:
   conveying a pretreated, conditioned ion exchange resin suspension into a container; and after one of transportation or storage the container; and
   conveying the ion-exchange resin suspension from the container to a reactor, wherein the energy input in the conveyance of the ion-exchange resin suspension does not exceed 150 W/m$^3$.

8. The process according to claim 7, wherein conveying the ion-exchange resin suspension into the container occurs at a temperature of from 50° C. to 90° C., followed by cooling the ion-exchange resin suspension down to a temperature below 40° C., and then by heating the ion-exchange resin suspension again to a temperature of from 50° C. to 90° C. before conveying the ion-exchange resin suspension to the reactor.

9. The process according to claim 7, wherein conveying the ion-exchange resin suspension into the container occurs at a temperature of from 60° C. to 80° C., followed by cooling the ion-exchange resin suspension down to a temperature below 40° C., and then by heating the ion-exchange resin suspension again to a temperature of from 60° C. to 80° C. before conveying the ion-exchange resin suspension to the reactor.

* * * * *